UNITED STATES PATENT OFFICE.

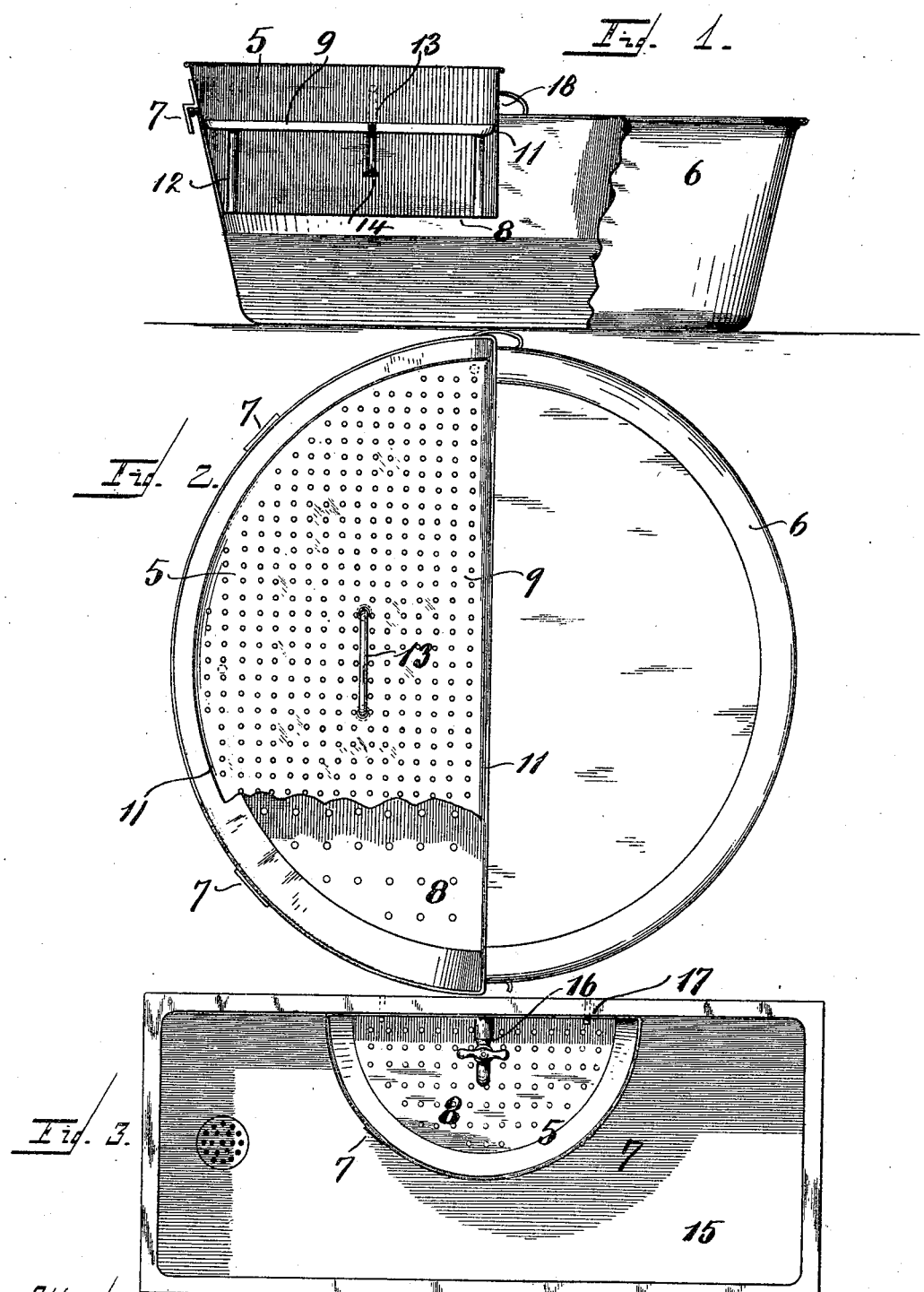

ROSA I. BYRNE, OF CINCINNATI, OHIO.

DRAINER OR COLANDER.

SPECIFICATION forming part of Letters Patent No. 681,473, dated August 27, 1901.

Application filed December 23, 1897. Serial No. 663,124. (No model.)

*To all whom it may concern:*

Be it known that I, ROSA I. BYRNE, a citizen of the United States, and a resident of Cincinnati, Hamilton county, State of Ohio, have invented a certain new and useful Drainer or Colander; and I do hereby declare the following to be a clear, full, and exact description of the invention, such as will enable others skilled in the art to which it appertains to make and use the same, attention being called to the accompanying drawings, with the reference-numerals marked thereon, which form a part of this specification.

This invention relates to a household article which is constructed with a view of being capable to be used in several ways, as follows: first, in connection with a dish-pan, to which it is fitted, when it may be used as a drainer to receive dishes after they are washed to permit the water to drain from them; second, in connection with an inserted attachment, when it may be used as a colander for straining purposes—as, for instance, when removing seed, skin, or other coarser matter from fruit-juices or other articles of food—and, third, it may be used in connection with a sink when suspended below a faucet to receive articles to be flushed.

My invention consists of a device constructed as described and pointed out in the annexed specification and claims following it and as illustrated in the accompanying drawings, in which—

Figure 1 is a vertical cross-section of a dish-pan with my device in position. Fig. 2 is a top view of Fig. 1. Fig. 3 is a top view at reduced scale of the device suspended above a sink and below a faucet.

The device consists, substantially, of a vessel 5, of segmental preferably half-cylindrical shape, of a size to be capable of insertion within a dish-pan 6, to which it is fitted. It is supported about midway between bottom and upper edge of the latter, its means of support being formed by two hook-shaped catches 7. Its round side is fitted to the side of the dish-pan—that is, it has the same inclination. Its bottom 8 is perforated. As thus shown and described it may be used as a drainer for dishes, which after they are washed and taken from the dish-pan 6 are deposited within vessel 5, the water draining off through the perforations in the bottom 8 thereof. For use as a colander for straining purposes, which requires finer holes, I use a removable tray-shaped bottom 9, having a marginal upwardly-projecting flange 11, fitted against the inside of vessel 5 and supported above the latter's bottom on legs 12. This tray-shaped bottom 9 has also perforations, but of smaller size than those of bottom 8, as best shown in Fig. 2. The upturned flange 11, fitted against the inside of vessel 5, prevents any of the retained matter from working through. To permit it to be readily lifted out, a handle 13 is provided, being substantially formed of a piece of wire, as shown, and passed through two holes in floor 9. Below the ends of this wire are turned or otherwise provided with an enlargement 14 sufficient to prevent them from slipping out of their holes. Connected in this manner the handle may drop down, and is therefore out of the way when the matter to be strained is stirred, as is generally the case.

In Fig. 3 the device is shown as supported above a sink 15 and below a faucet 16, in which position it may be used, for instance, for flushing articles contained therein. For purposes of such suspension hooks 17 are provided, which are received by holes 18 in the straight side of vessel 5.

Having described my invention, I claim as new—

1. An article for the purpose described, consisting of a half-circular vessel 5, with a perforated bottom 8 and capable of being supported in a horizontal position, either by its round side or by its flat one, means provided for such alternate support, consisting of hook-shaped catches 7 on the outside of its round side and holes 18 in its straight one in combination with a second bottom 9 above bottom 8 having also perforations, but of smaller size than the latter, a marginal flange 11 projecting upwardly from bottom 9 and supporting legs 12 below it, all as shown and described.

2. An article for the purpose described, consisting of a half-circular vessel 5, with a perforated bottom 8, and capable of being supported in a horizontal position, either by its round side or by its flat one, means provided for such alternate support, consisting of hook-shaped catches 7 on the outside of its round side and holes 18 in its straight one, in combination with a second bottom 9 above bottom 8, having also perforations, but of smaller size than the latter, a marginal flange 11 projecting upwardly from bottom 9 and supporting legs 12 below it, a loosely-connected handle 13 passing through perforations in bottom 9 and provided with enlargements 14 below the latter for the purpose described.

In testimony whereof I hereunto affix my signature in presence of two witnesses.

ROSA I. BYRNE.

Witnesses:
C. SPENGEL,
ARTHUR KLINE.